(12) United States Patent
VanHolstyn

(10) Patent No.: US 7,963,096 B2
(45) Date of Patent: Jun. 21, 2011

(54) REFLECTIVE PULSE ROTARY ENGINE

(76) Inventor: Alex VanHolstyn, Comstock Park, MI (US)

( * ) Notice: Subject to any disclaimer, the term of this patent is extended or adjusted under 35 U.S.C. 154(b) by 826 days.

(21) Appl. No.: 11/874,271

(22) Filed: Oct. 18, 2007

(65) Prior Publication Data

US 2008/0178572 A1    Jul. 31, 2008

Related U.S. Application Data

(60) Provisional application No. 60/856,130, filed on Nov. 2, 2006.

(51) Int. Cl.
*F02C 3/14* (2006.01)
(52) U.S. Cl. .............................. 60/39.35; 60/39.34
(58) Field of Classification Search ........... 60/39.37, 60/39.38, 39.76, 224, 247, 729, 767, 39.33–39.35, 60/244; 123/200–229; 415/9, 181
See application file for complete search history.

(56) References Cited

U.S. PATENT DOCUMENTS

| | | | |
|---|---|---|---|
| 469,404 A * | 2/1892 | Irish ............................. | 415/82 |
| 814,187 A | 3/1906 | Clark | |
| 857,980 A | 6/1907 | Cazin | |
| 1,171,121 A | 2/1916 | Heilmann | |
| 1,291,273 A | 1/1919 | Tyler | |
| 1,333,204 A | 3/1920 | Eisele | |
| 1,588,632 A | 6/1926 | Sullivan | |
| 1,677,198 A | 7/1928 | Naileigh | |
| 2,222,183 A | 11/1940 | Rocheville | |
| 2,389,632 A | 11/1945 | Mossbach | |
| 2,456,417 A | 12/1948 | Horsdal | |
| 2,579,321 A * | 12/1951 | Guercken ...................... | 60/39.39 |
| 2,671,315 A * | 3/1954 | Rocheville ................... | 60/39.35 |
| 2,970,745 A | 2/1961 | Berchtold | |
| 3,145,533 A | 8/1964 | Ollinger | |
| 3,321,911 A | 5/1967 | Myles | |
| 3,401,676 A | 9/1968 | Wanzenberg | |
| 3,650,105 A | 3/1972 | Toye | |
| 3,727,401 A | 4/1973 | Fincher | |
| 3,811,275 A | 5/1974 | Mastrobuono | |
| 3,811,796 A | 5/1974 | Coleman, Jr. et al. | |
| 3,940,924 A | 3/1976 | Miyada | |
| 4,347,698 A | 9/1982 | Nelson | |
| 4,357,794 A | 11/1982 | Nelson | |
| 4,590,761 A | 5/1986 | Zettner | |
| 4,603,549 A | 8/1986 | Albrecht | |
| 4,702,072 A | 10/1987 | Kielhorn | |

(Continued)

*Primary Examiner* — Michael Cuff
*Assistant Examiner* — Phutthiwat Wongwian
(74) *Attorney, Agent, or Firm* — Varnum, Riddering, Schmidt & Howlett LLP

(57) ABSTRACT

A rotary engine includes a rotor having one or more combustion chambers connected to an exhaust passageway extending radially outward from the combustion chamber to an exhaust port adjacent a peripheral edge of the rotor. The exhaust gas is expelled at an angle to thereby generate cause the rotor to rotate. The housing may include reflective surfaces that reflect shockwaves from the exhaust gas back towards vanes on the rotor to thereby capture additional energy from the exhaust gas. The housing may also include stators that capture additional energy from the exhaust gas and rotate the rotor. An intake port fluidly connected to the combustion chamber is aligned with an opening in the housing as the rotor rotates to thereby allow comprised air to flow into the combustion chamber. As the combustion chamber rotates, it is closed off by a closed portion of the housing, fuel is injected, and ignited, to thereby generate exhaust gases and generate power. The engine does not include reciprocating components, and relatively few moving parts are required.

19 Claims, 18 Drawing Sheets

U.S. PATENT DOCUMENTS

| | | |
|---|---|---|
| 4,741,154 A | 5/1988 | Eidelman |
| 4,769,987 A | 9/1988 | Arold |
| 4,971,002 A | 11/1990 | Le |
| 5,138,831 A | 8/1992 | Cowan, Sr. |
| 5,156,115 A | 10/1992 | Blount |
| 5,222,922 A | 6/1993 | Takahashi et al. |
| 5,224,847 A | 7/1993 | Kurisu |
| 5,237,811 A | 8/1993 | Stockwell |
| 5,237,814 A | 8/1993 | Chen |
| 5,251,594 A | 10/1993 | Meyer |
| 5,263,313 A | 11/1993 | Chow |
| 5,408,824 A | 4/1995 | Schlote |
| 5,555,866 A | 9/1996 | Wilson |
| 5,560,196 A * | 10/1996 | Schlote .................. 60/39.35 |
| 5,660,038 A | 8/1997 | Stone |
| 5,901,554 A | 5/1999 | Greschik |
| 5,954,017 A | 9/1999 | Federowicz |
| 6,024,549 A | 2/2000 | Lee |
| 6,032,636 A | 3/2000 | Kajino |
| 6,035,630 A | 3/2000 | Soos |
| 6,070,565 A | 6/2000 | Miniere |
| 6,071,098 A | 6/2000 | Richards |
| 6,125,814 A | 10/2000 | Tang |
| 6,128,894 A | 10/2000 | Joos et al. |
| 6,128,897 A | 10/2000 | Kuhn |
| 6,129,068 A | 10/2000 | Wingate, Jr. |
| 6,142,758 A | 11/2000 | Taggett |
| 6,146,120 A | 11/2000 | Harms |
| 6,189,502 B1 | 2/2001 | Lai |
| 6,237,560 B1 | 5/2001 | Saito |
| 6,247,443 B1 | 6/2001 | Pelleja |
| 6,250,280 B1 | 6/2001 | Miller |
| 6,257,196 B1 | 7/2001 | Alvarado |
| 6,273,055 B1 | 8/2001 | White |
| 6,289,867 B1 | 9/2001 | Free |
| 6,295,802 B1 | 10/2001 | Lior et al. |
| 6,298,821 B1 | 10/2001 | Bolonkin |
| 6,305,345 B1 | 10/2001 | Bakhtine |
| 6,318,067 B1 | 11/2001 | Marquard |
| 6,341,590 B1 | 1/2002 | Barrera et al. |
| 6,347,611 B1 | 2/2002 | Wright |
| 6,401,687 B1 | 6/2002 | Kozlov et al. |
| 6,439,868 B1 | 8/2002 | Tomoiu |
| 6,484,687 B1 | 11/2002 | Duncan |
| 6,550,443 B1 | 4/2003 | Vanmoor |
| 6,606,973 B2 | 8/2003 | Moe |
| 6,904,750 B2 * | 6/2005 | Venkataramani et al. ... 60/226.1 |
| 7,685,824 B2 * | 3/2010 | Dahm .............................. 60/767 |
| 2004/0000145 A1 | 1/2004 | Leyva et al. |
| 2004/0020185 A1* | 2/2004 | Brouillette et al. .......... 60/39.35 |
| 2004/0154310 A1 | 8/2004 | Stanevicius |
| 2004/0194469 A1 | 10/2004 | Butler et al. |

* cited by examiner

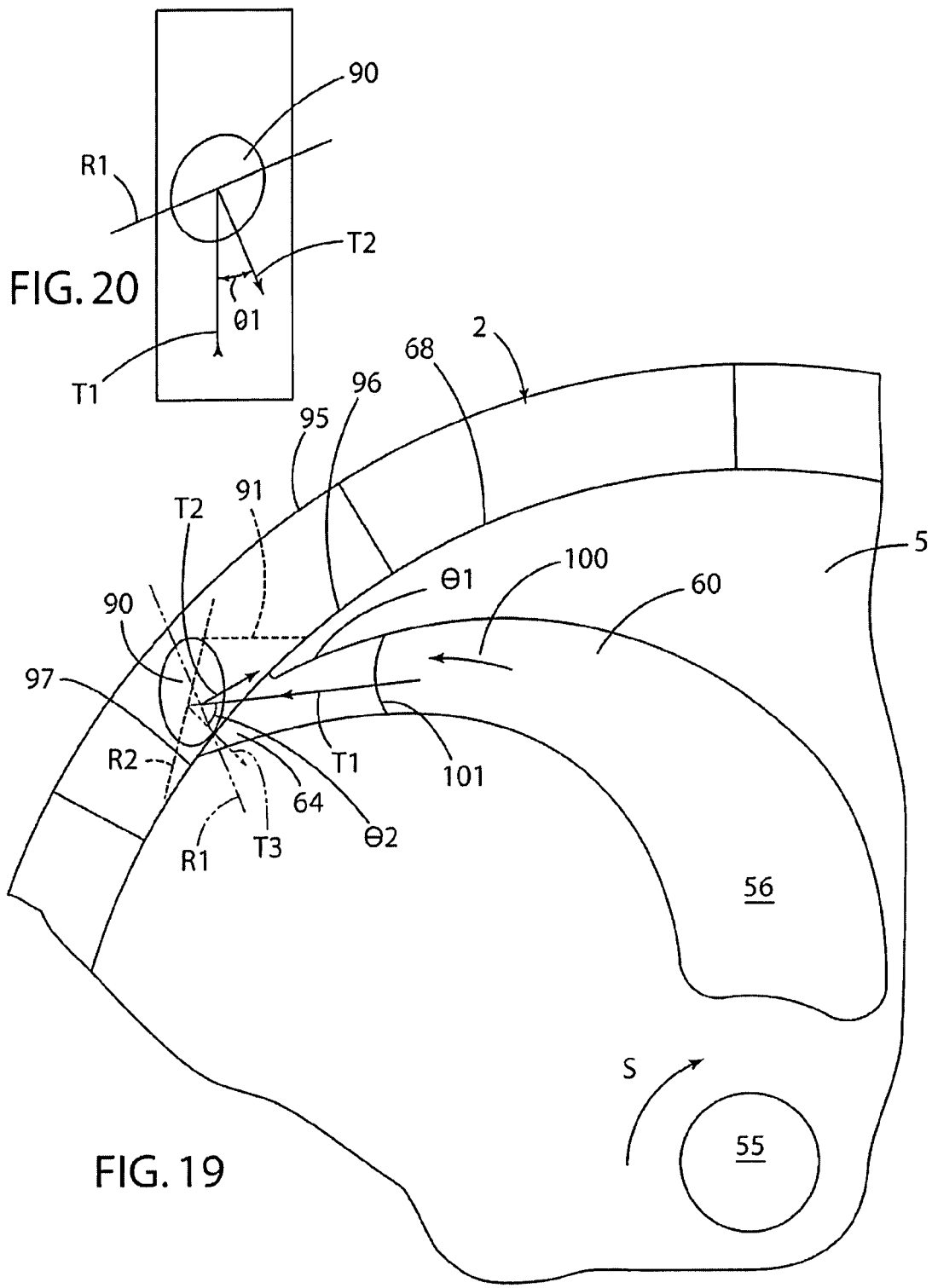

REFLECTIVE PULSE ROTARY ENGINE

CROSS REFERENCE TO RELATED APPLICATIONS

The present application claims the benefit of U.S. Provisional Patent Application No. 60/856,130, entitled REFLECTIVE PULSE ROTARY ENGINE, filed on Nov. 2, 2006, the entire contents of which are incorporated by reference.

BACKGROUND OF THE INVENTION

Various types of engines have been developed for use in motor vehicles, aircraft, motorcycles, generators, power tools, and the like. Known engine designs include gas turbine engines, diesel engines, two and foul stroke gasoline engines, and rotary engines. Such engines have been widely used in numerous applications. However, known engine designs suffer from various drawbacks that are inherent in the basic designs of such engines.

Accordingly, an invention that alleviates the problems associated with known engine designs would be desirable.

SUMMARY OF THE INVENTION

One aspect of the present invention is a rotary pulse engine having a housing and a rotor disposed in the housing. The rotor includes one or more combustion chambers having openings that align with intake ports at predefined annular position of the rotor relative to the housing. The combustion chambers include an exhaust/thrust port that expels heated gas and combustion byproducts from the rotor at an angle to thereby forcibly spin the rotor. One or more reflective surfaces mounted to the housing reflect shockwaves from the port back towards vanes on the rotor. The rotor vanes capture energy from the shockwaves/exhaust gas to provide additional forces acting on the rotor. In this way, the engine captures additional energy from the combustion process to increase operating efficiency. The engine of the present invention does not include any reciprocating components, and therefore does not suffer from the problems associated with conventional reciprocating components. The engine may include a plurality of combustion chambers and associated thrust ports, and the combustion chambers and thrust ports may have different configurations that provide peak power at different rpms to thereby provide an overall power output matching the needs of a particular application.

These and other features, advantages, and objects of the present invention will be further understood and appreciated by those skilled in the art by reference to the following specification, claims, and appended drawings.

BRIEF DESCRIPTION OF THE DRAWINGS

FIG. 1;

FIG. 11;

FIG. 11;

FIG. 16;

FIG. 19 is a fragmentary view of a portion of the rotor and the reflector plate showing an example of a reflection axis;

FIG. 20 is a partially schematic view showing the angle of reflection;

DETAILED DESCRIPTION OF PREFERRED EMBODIMENT

Figure 1:
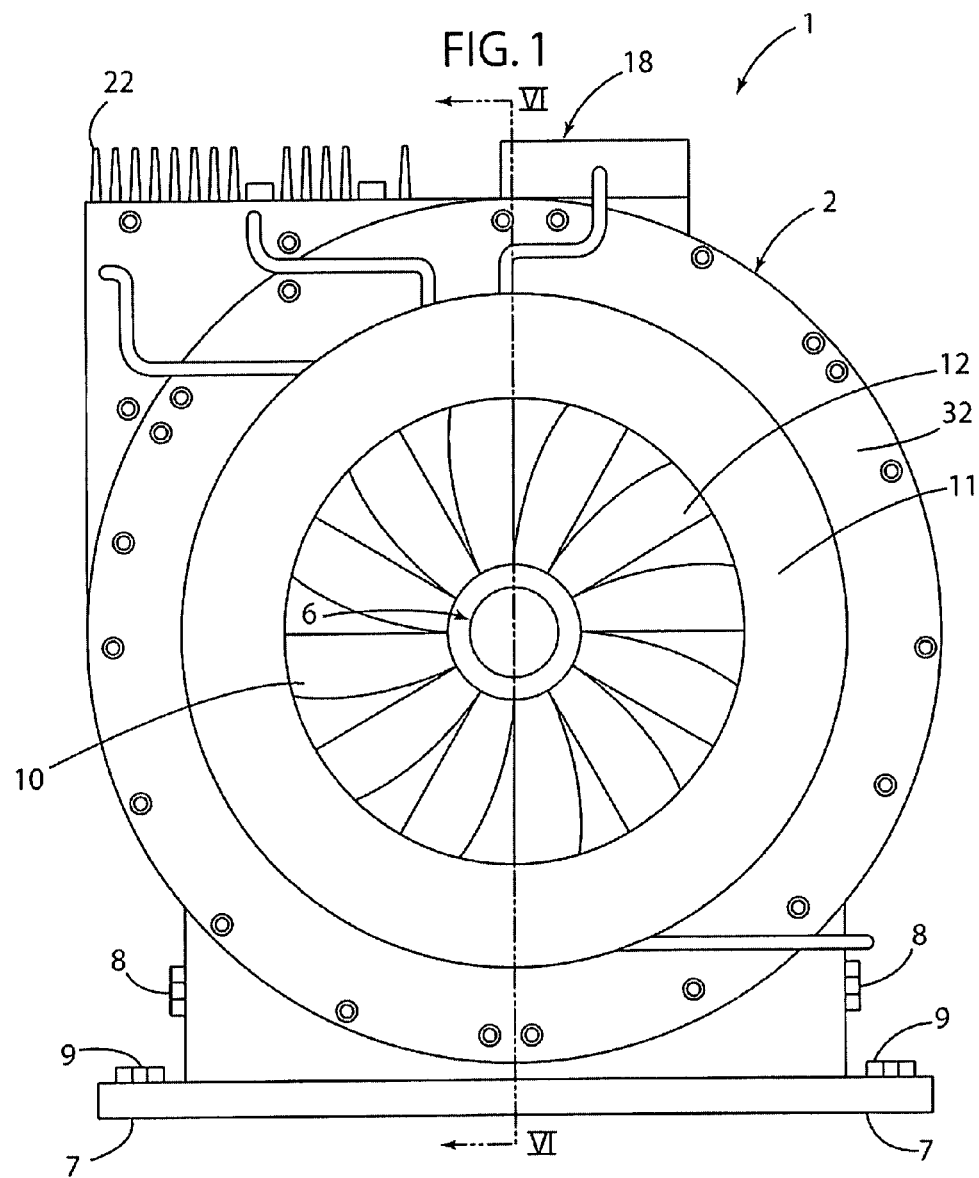
FIG. 1 is a front elevational view of a rotary pulse engine according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Engine Construction

Figure 2:
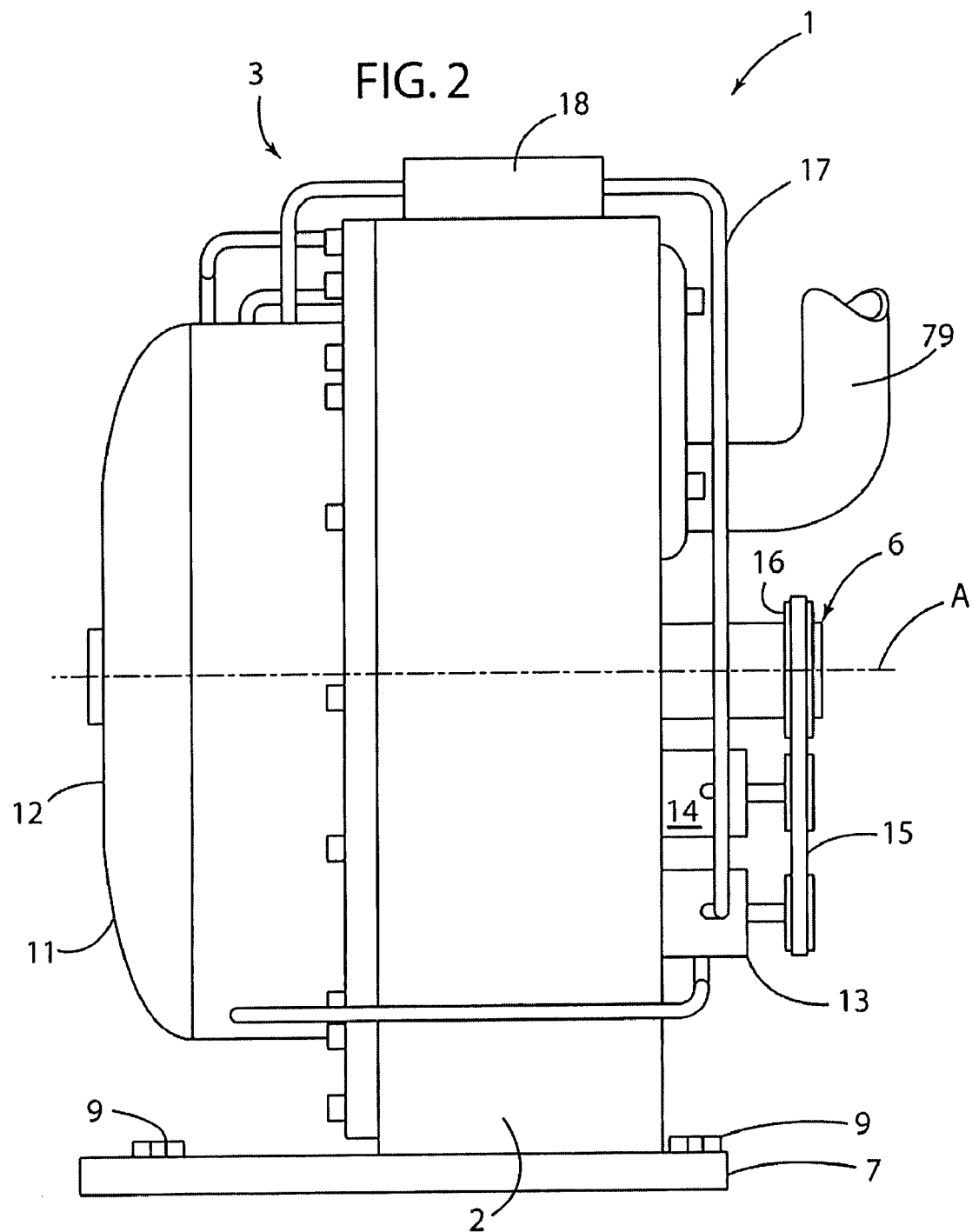
FIG. 2 is a side elevational view of the rotary pulse engine of FIG. 1.
Figure 13:
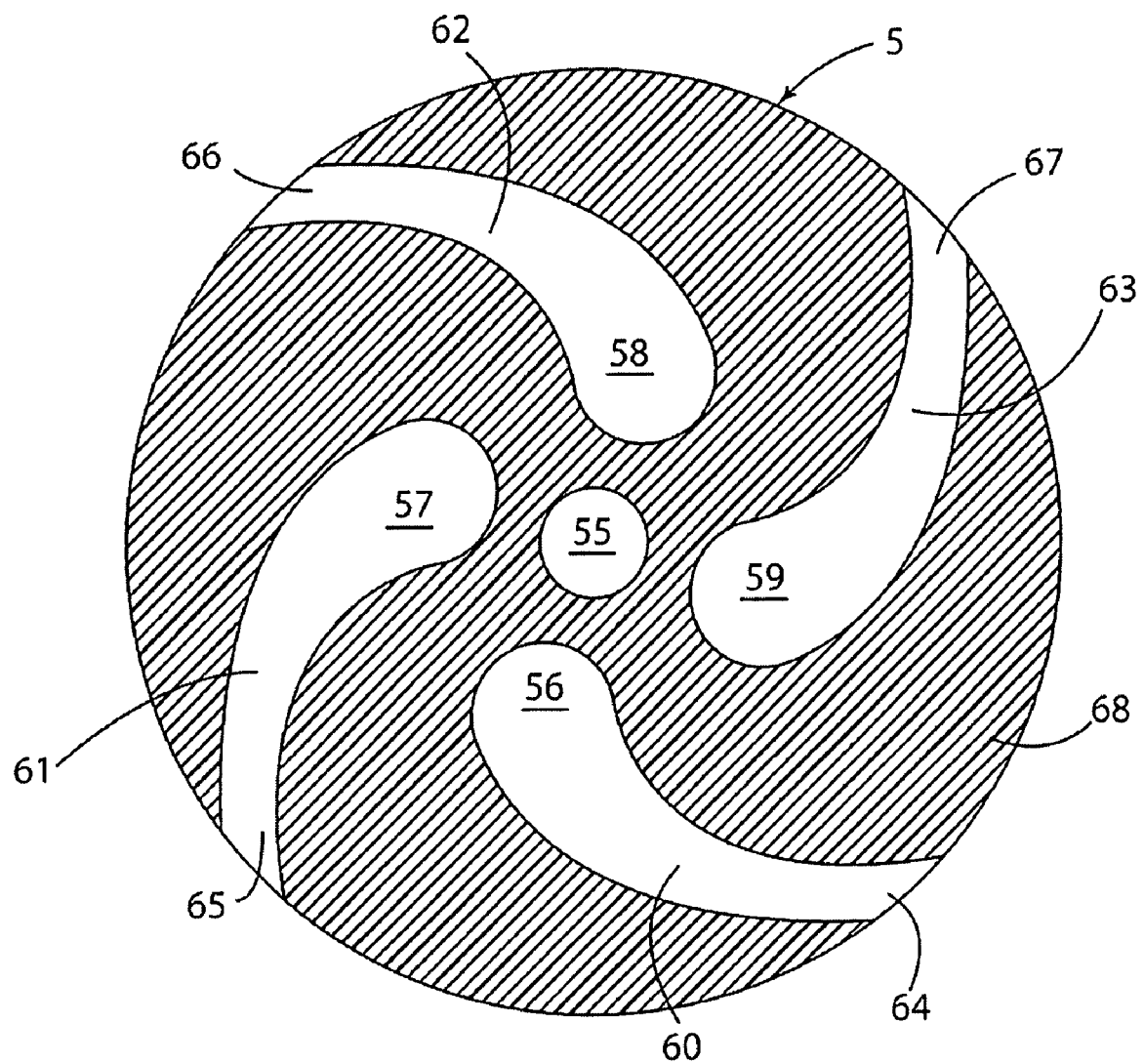
FIG. 13 is a cross-sectional view of the rotor taken along the line XIII-XIII.

With reference to FIGS. 1 and 2, a rotary pulse engine 1 according to one aspect of the present invention includes a housing 2 that rotatably supports a rotor 5 via a shaft 6. As described in more detail below, rotor 5 includes a plurality of combustion chambers 56-58 (FIG. 13) that are fluidly connected to passageways 60-63 that spiral outward to exhaust ports 64-67 in outer peripheral surface 68 of rotor 5. In use, exhaust gas is expelled from exhaust ports 64-67 at a high velocity, thereby generating forces that rotate rotor 5.

Figure 3:
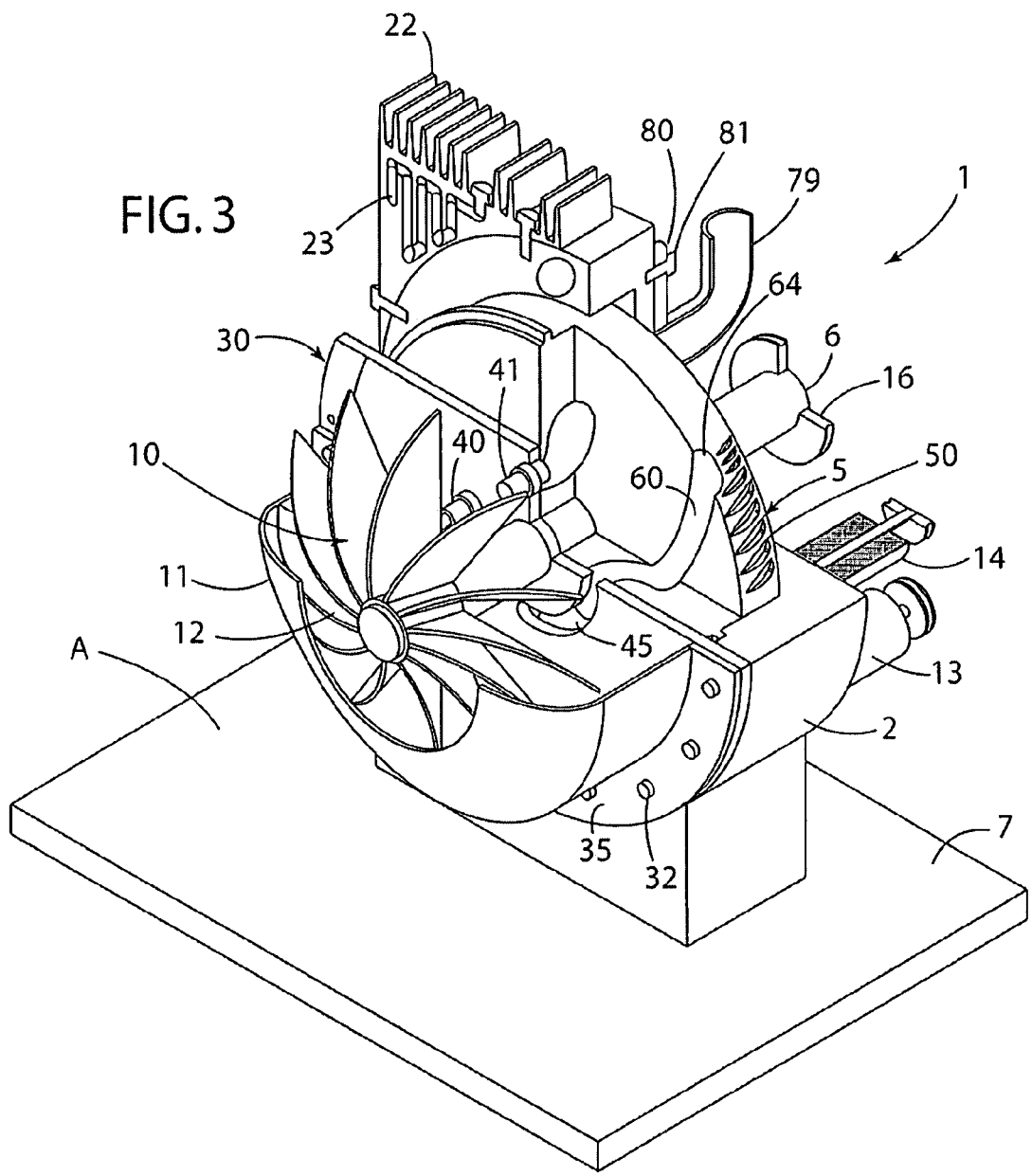
FIG. 3 is an isometric view of the rotary pulse engine of FIG. 1 wherein some of the components are cut-away.

Referring again to FIG. 1, a pair of mounting brackets 7 or the like are secured to the housing 2 by threaded fasteners such as bolts 8. The brackets 7 mount the engine 1 in a vehicle or other structure via threaded fasteners 9. A compressor fan 10 (see also FIGS. 3 and 4) is fixedly mounted to the shaft 6, and rotates therewith to compress air that is drawn into the engine 1 through a main intake port 12 in a fan housing 11 that is mounted to a front side 3 of housing 2. A starter motor 13 (FIG. 2) and alternator 14 are operably connected to the shaft 6 via a belt 15 and a pulley 16 or the like mounted to shaft 6. As also described in more detail below, an electrical power supply line 17 supplies power from alternator 13 to a controller 18 of the ignition system of the engine 1. In addition to controlling the ignition, controller 18 may be an engine control unit that also controls the fuel supply/injection of engine 1.

Housing 2 may include cooling fins 22 that dissipate heat generated by the combustion process to provide air cooling. Also, housing 2 may include one or more cooling passageways 23 that circulate cooling fluid through the housing 2 and a radiator 25 to provide additional cooling for the engine 1 if additional liquid cooling is required for a particular application. Radiator 25 may be mounted at a remote location away from engine 1, or it may be mounted in the fan housing 11.

Figure 4:
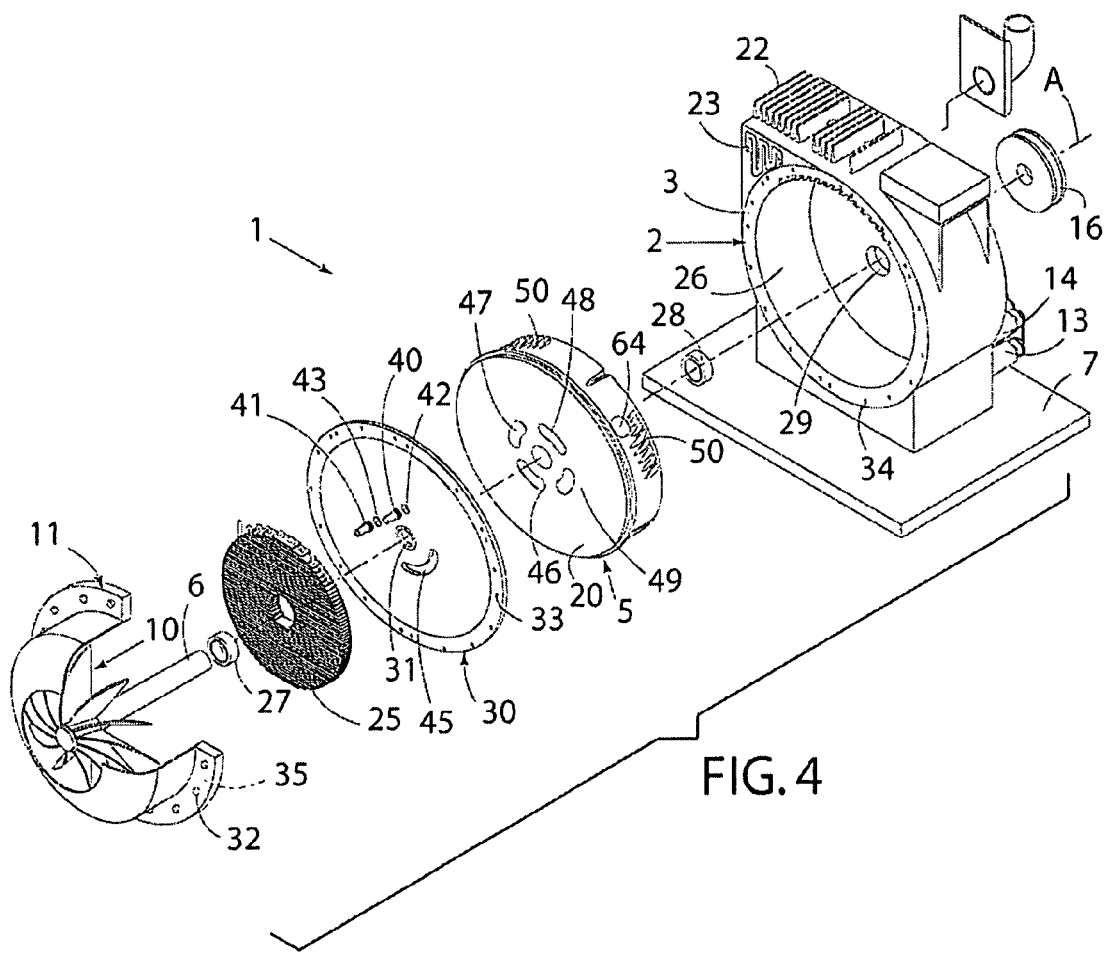
FIG. 4 is an exploded isometric view of the rotary pulse engine.
Figure 5:
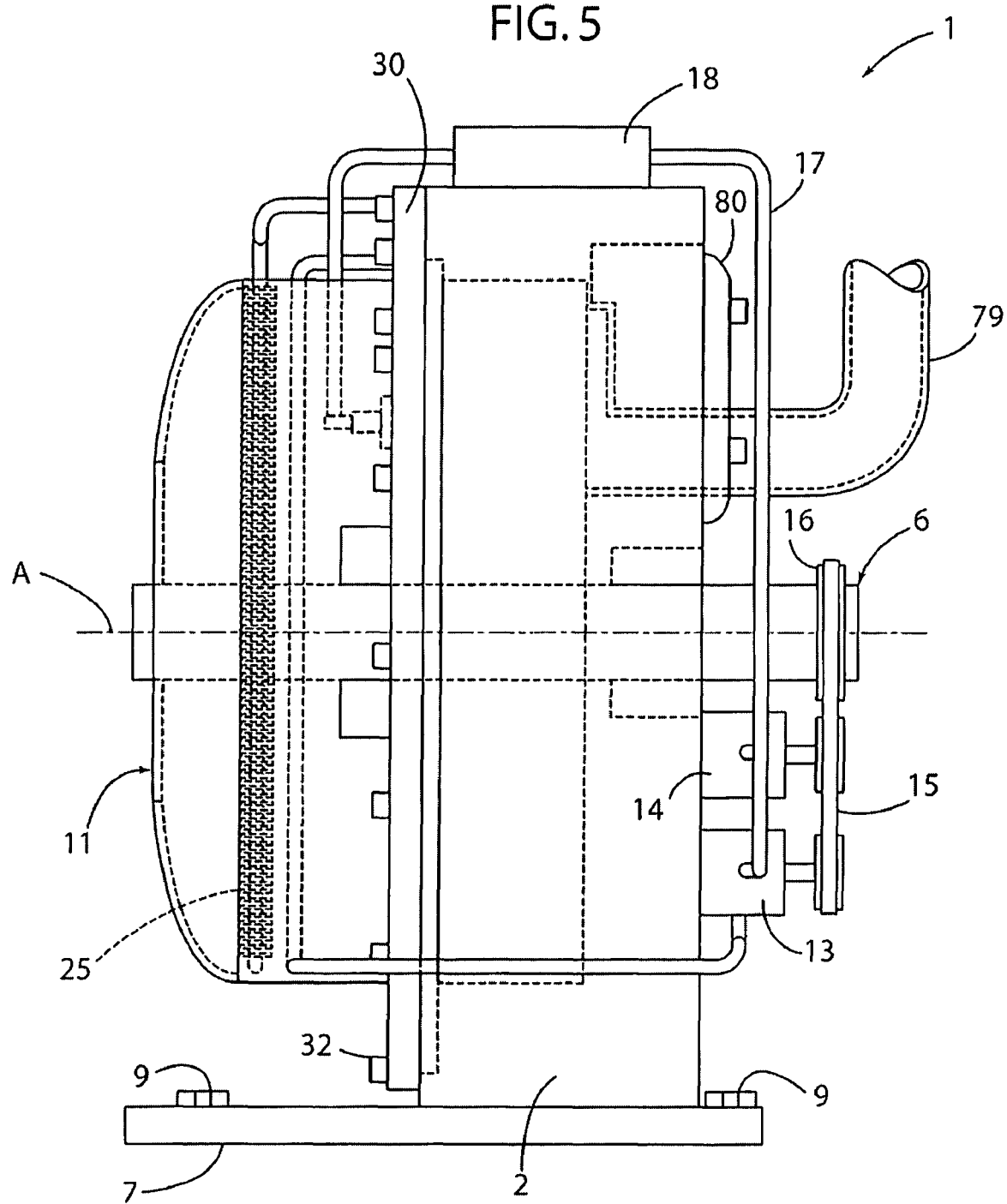
FIG. 5 is a side elevational view showing the internal components in dashed lines.

As shown in FIG. 4, housing 2 includes an enlarged cavity 26 that is generally cylindrically-shaped. When engine 1 is assembled, rotor 5 is disposed within cylindrical cavity 26, and the rotor 5 is rotatably supported by shaft 6 and bearings 27 and 28. When assembled, bearing 28 is received in opening 29 in housing 2, and bearing 27 is received in opening 31 of a sealing plate 30. A plurality of bolts 32 or other suitable fasteners extend through openings in flange 35 of fan housing 11, through openings 33 in sealing plate 30, and into threaded openings 34 in housing 2 to thereby securely mount the housing 11 and sealing plate 30 to the housing 2.

Referring again to FIG. 4, sealing plate 30 includes threaded openings 42 and 43 that receive a fuel injector 40 and a spark plug 41, respectively. Fuel injector 40 is operably connected to controller 18 or to a separate fuel injection controller (not shown) that controls the volume and timing of the fuel supplied to engine 1 during tie fuel injection process. As described in more detail below, an opening 45 in sealing plate 30 forms an air supply manifold that aligns with intake ports 46-48 in rotor 5 as rotor 5 rotates relative to sealing plate 30 during operation of the engine 1. A carburetor (not shown) may be utilized instead of fuel injector 40.

With further reference to FIGS. 10-13, rotor 5 is generally disk-shaped with a rear side/surface 19, a front side/surface 20, and a peripheral outer surface 68. Rotor 5 includes a central opening 55 having a mechanical connector such as a spline or the like (not shown) that rigidly fixes the rotor 5 to the shaft 6. Intake ports 46-49 in front surface 20 are fluidly connected to combustion chambers 56-59, respectively, formed within rotor 5. Combustion chambers 56-59 extend outwardly in a spiral fashion to form passageways 60-63, respectively. Passageways 60-63 are connected to exhaust ports 64-67 in peripheral outer surface 68 of rotor 5. In operation, exhaust gas is expelled from exhaust ports 64-67 at an angle, thereby generating a moment or torque acting on shaft 6. It will be understood that the number of combustion chambers, passageways, and exhaust ports may be different depending upon the needs of a particular application. Also, the combustion chambers, passageways, and exhaust ports of a given engine 1 are not necessarily identical in configuration. For example, an engine 1 may include a rotor 5 having four combustion chambers and passageways of a first configuration, and (lie same rotor 5 may include four additional combustion chambers and passageways having a different size and shape. The size and shape of the combustion chambers and passageways determines the torque versus rpm curve, and a single engine may therefore be configured to provide an optimum torque versus rpm curve for a particular application. Also, an engine 1 may include a plurality of rotor 5. Each rotor 5 may be identical, or each rotor 5 may have a different configuration with combustion chambers and passageways of different sizes and/or shapes.

Figure 14:
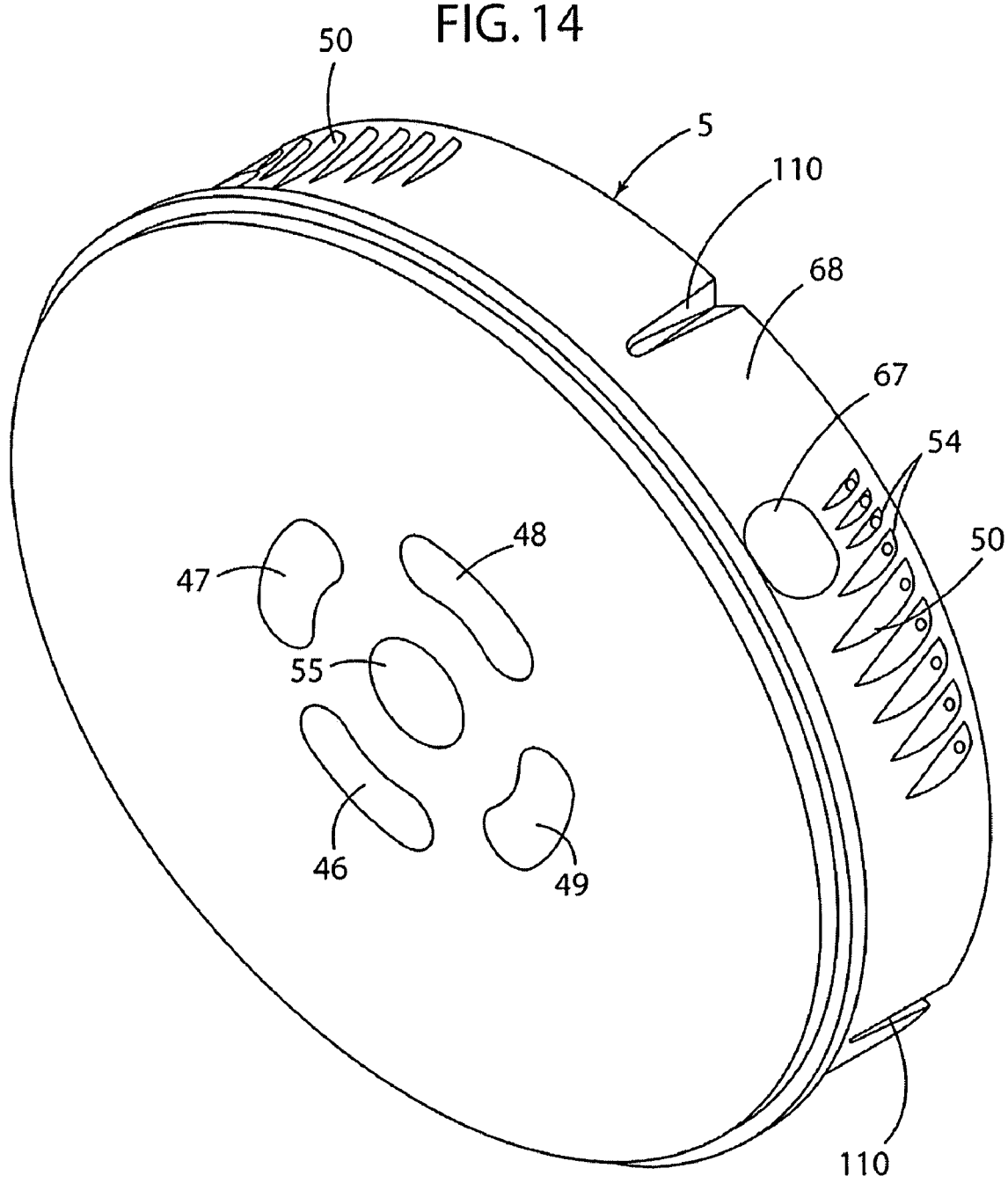
FIG. 14 is an isometric view of the rotor.
Figure 15:
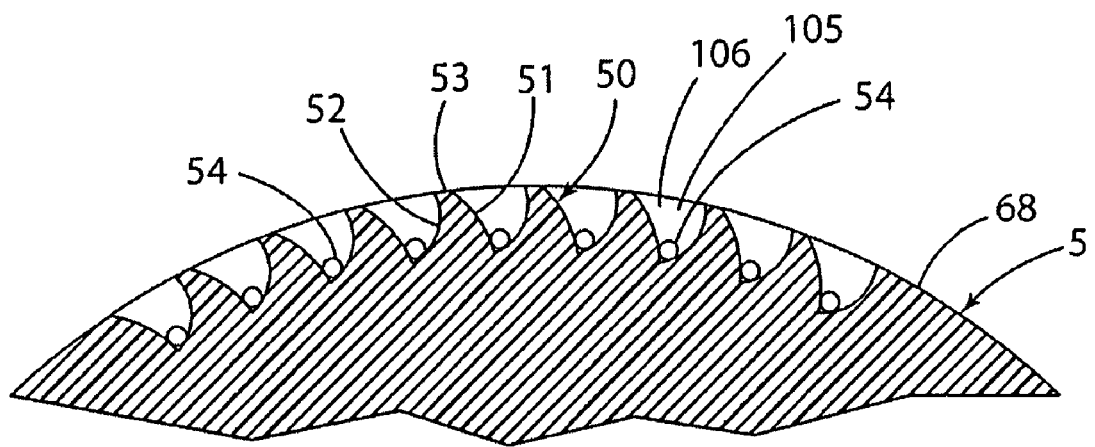
FIG. 15 is a fragmentary, cross-sectional view of a portion of the rotor taken along the line XV-XV.

Rotor 5 includes a plurality of rotor vanes 50 (FIGS. 11 and 14) formed in outer peripheral surface 68 adjacent exhaust ports 64-67. With further reference to FIG. 15, each rotor vane 50 includes a leading surface 51 and a trailing surface 52 that taper towards one another at edge or end 53. In the illustrated example, the surfaces 51 and 52 extend generally parallel to the axis A, and edge 53 is coincident with cylindrical peripheral surface 68. However, the rotor vanes 50 may have various shapes and configurations depending upon the particular engine design and the requirements for such design. The surfaces 51 and 52 of adjacent vanes 50 define elongated pockets 105 having end surfaces 106 with exhaust vent openings 54 extending through end surfaces 106 to outer rear surface 19 of rotor 5. Rotor pockets 105 may be spaced apart to facilitate cooling and to reduce the mass of rotor 5. Also, rotor vanes 50 may be in the form of elongated blades having a cross-sectional shape forming an airfoil. As described in more detail below, during operation of engine 1, shockwaves formed by the combustion flame wall and the exhaust gas behind the shockwave, are expelled from exhaust ports 64-67 of rotor 5. The shockwaves and exhaust gas are reflected back towards vanes 50 of rotor 5 by reflective surfaces 90 (see also FIG. 16), and the exhaust gas then escapes through exhaust vent holes 54 into exhaust port 75 (FIG. 8) of housing 2. In general, vanes 50 are formed in rotor 5 adjacent the exhaust ports 64-67, and some vanes 50 may be located on both sides of the exhaust ports. The location and configuration of vanes 50 will depend, at least in part, upon the shape and/or angle of reflective surfaces 90 described in more detail below in connection with FIGS. 19 and 20. Rotor 5 may include one or more pressure vents 110.

Figure 6:
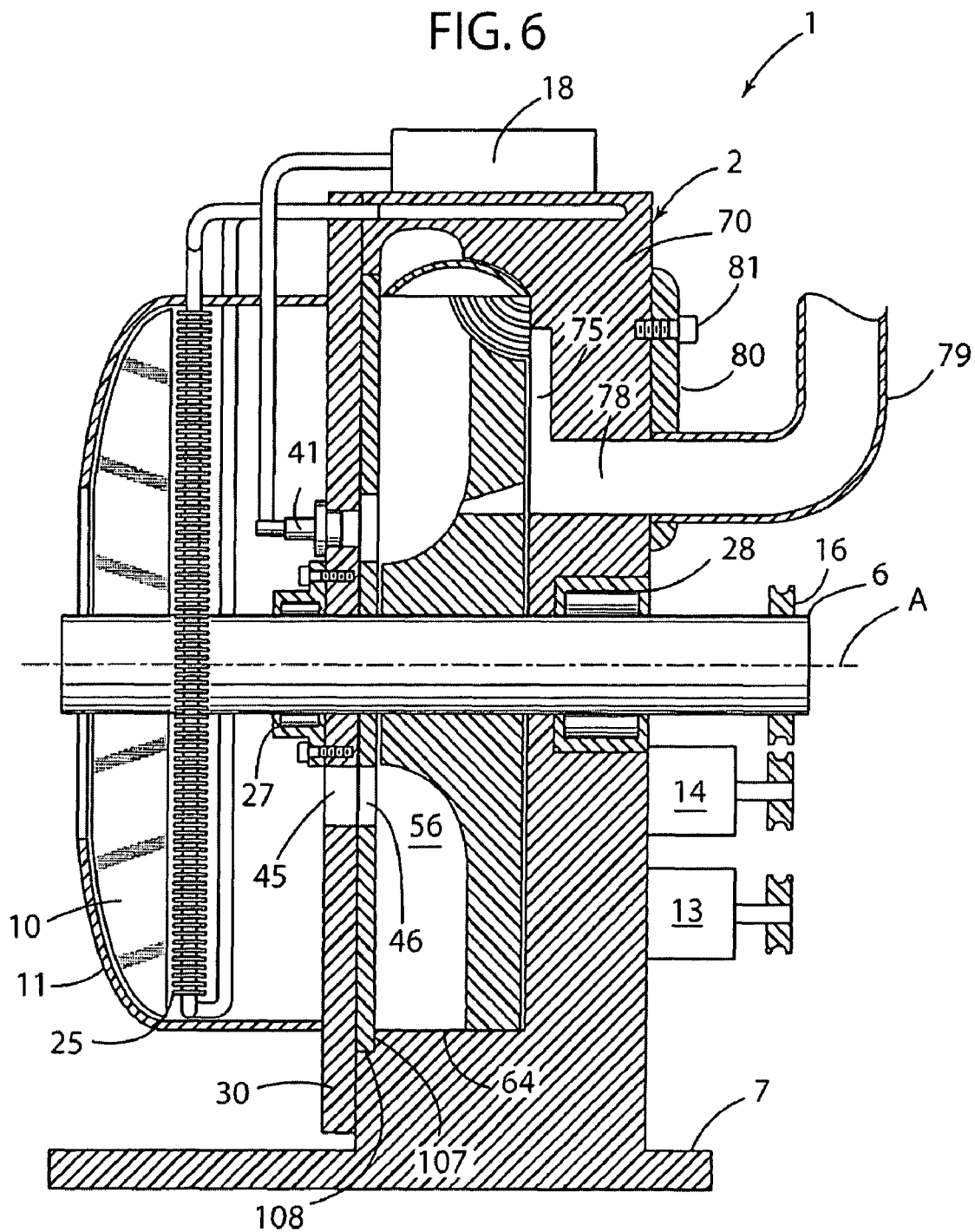
FIG. 6 is a cross-sectional view of the rotary pulse engine taken along the line VI-VI.

Rotor 5 includes seal in the form of an annular rim 107 that extends outwardly from peripheral surface 68 of rotor 5. Rim 107 is closely received in an annular groove 108 (FIG. 6) formed by housing 2 and sealing plate 30. Rim 107 substantially seals rotor 5 relative to housing 2 and prevents escape of exhaust gas into the space or gap between sealing plate 30 and front surface 20 of rotor 5. The rim 107 thereby isolates and seals the exhaust gas from the intake air supply. Rotor 5 may include a second seal/rim (not shown) that is substantially the same as rim 107 to seal the exhaust side of rotor 5 within housing 2. The second rim projects outwardly from peripheral surface 68 of rotor 5 between the ends of rotors 50 and outer surface 19 of rotor 5. If rotor 5 includes a second seal/rim, housing 2 includes a second annular groove (not shown) that is substantially similar to groove 108 (FIG. 6) that closely receives the second rim of rotor 5. The pressure vents 110 vent pressure that may slip down the rotor perimeter and leak into (the inlet side. Pressure vents 110 release any such escaped exhaust gas to the exhaust side of the engine.

Figure 7:
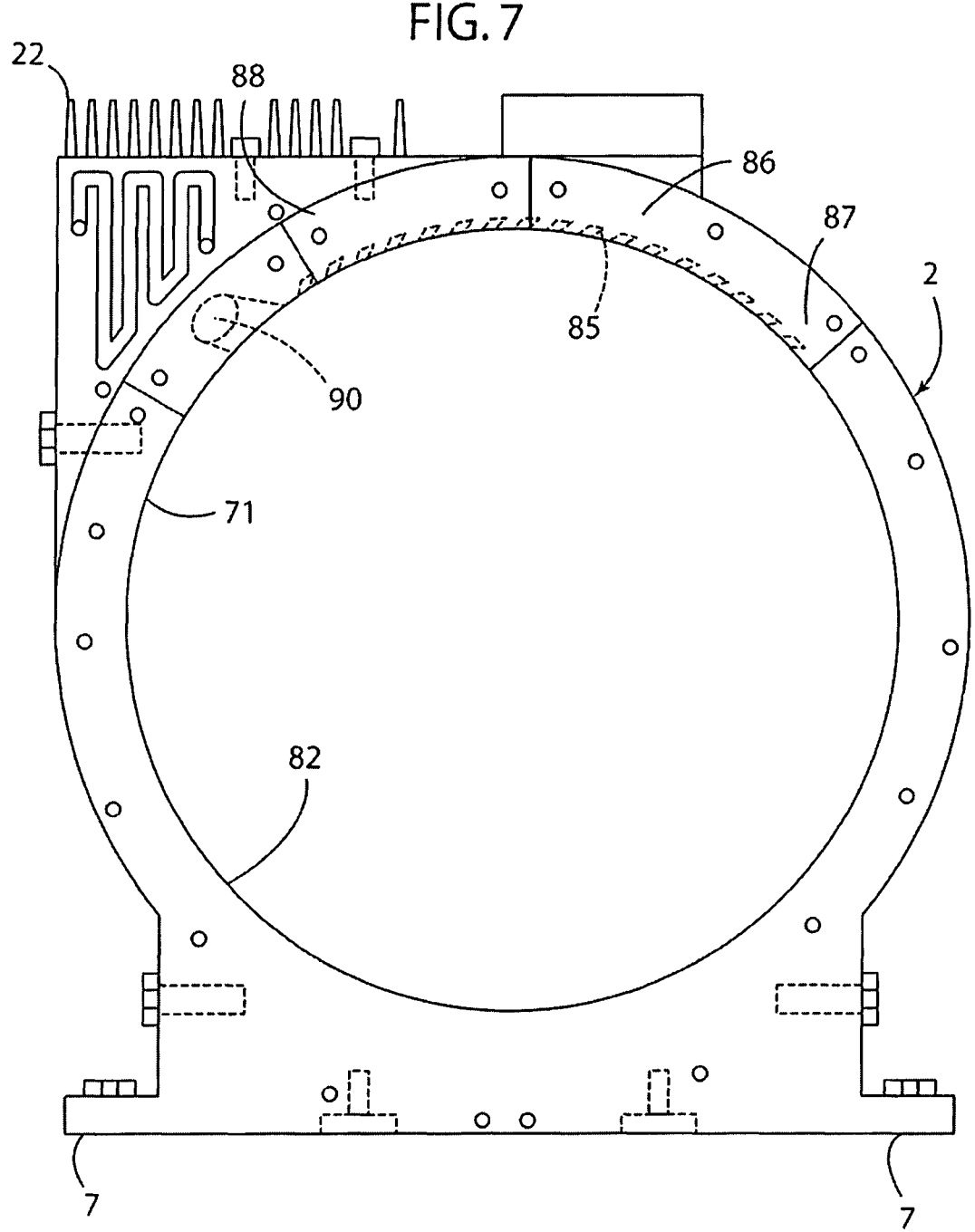
FIG. 7 is a front elevational view of the intake side of the housing.
Figure 8:
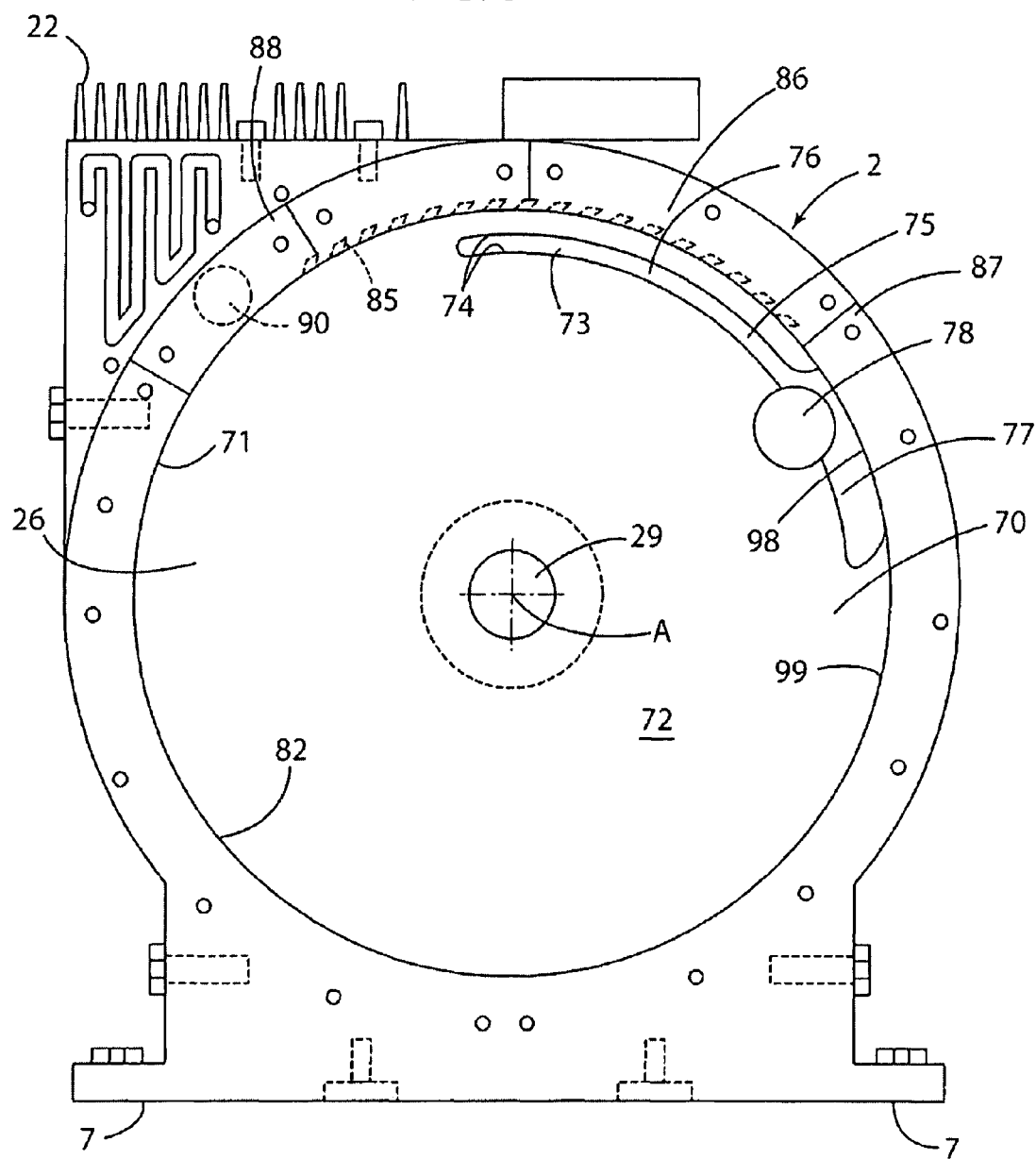
FIG. 8 is a front elevational view of the housing and exhaust side sealing plate.

With reference to FIGS. 7 and 8, housing 2 includes an inner surface 71 that is substantially cylindrical in shape. A seal plate 70 (FIG. 8) defines a generally flat inner surface 72, and the cylindrical surface 71 and flat surface 72 together define cylindrical cavity 26. Seal plate 70 may be integrally formed with housing 2, or it may be a separate part that can be removed as shown in FIG. 7. An exhaust port 75 (FIG. 8) is formed in surface 72 of rear seal plate 70. Exhaust port 75 includes an elongated portion 76 having a U-shaped cross section with lower surface 73 and opposite side surfaces 74 forming a curved groove, and an enlarged pocket portion 77. The grooves 76 and pockets 77 are fluidly connected to an opening 78 that connects to an exhaust pipe 79 (FIG. 6) secured to rear seal plate 70 by a plate 80 and threaded fasteners 81.

A plurality of stators 85 are formed in inner surface 71 of housing 2. The stators 85 are formed in an upper portion of the housing 86 extending from a first portion 87 of housing 2 that is adjacent exhaust opening 78 to a second portion 88 that is about 90° counterclockwise from first portion 87 when viewed in the orientation of FIG. 8. In the illustrated example, stators 85 are in the form of fins or blades extending generally parallel to axis A of engine 1.

However, it will be understood that the stators may have a different shape/configuration depending upon the requirements of a specific engine design.

Figure 17:
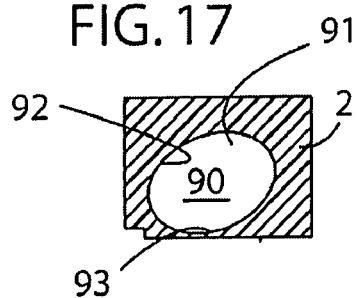
FIG. 17 is an enlarged view of the reflector plate taken along the line XVII-XVII.
Figure 18:
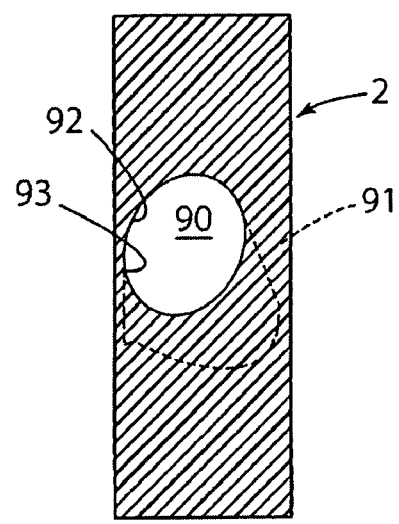
FIG. 18 is an enlarged view of the reflector plate taken from another angle.
Figure 16:
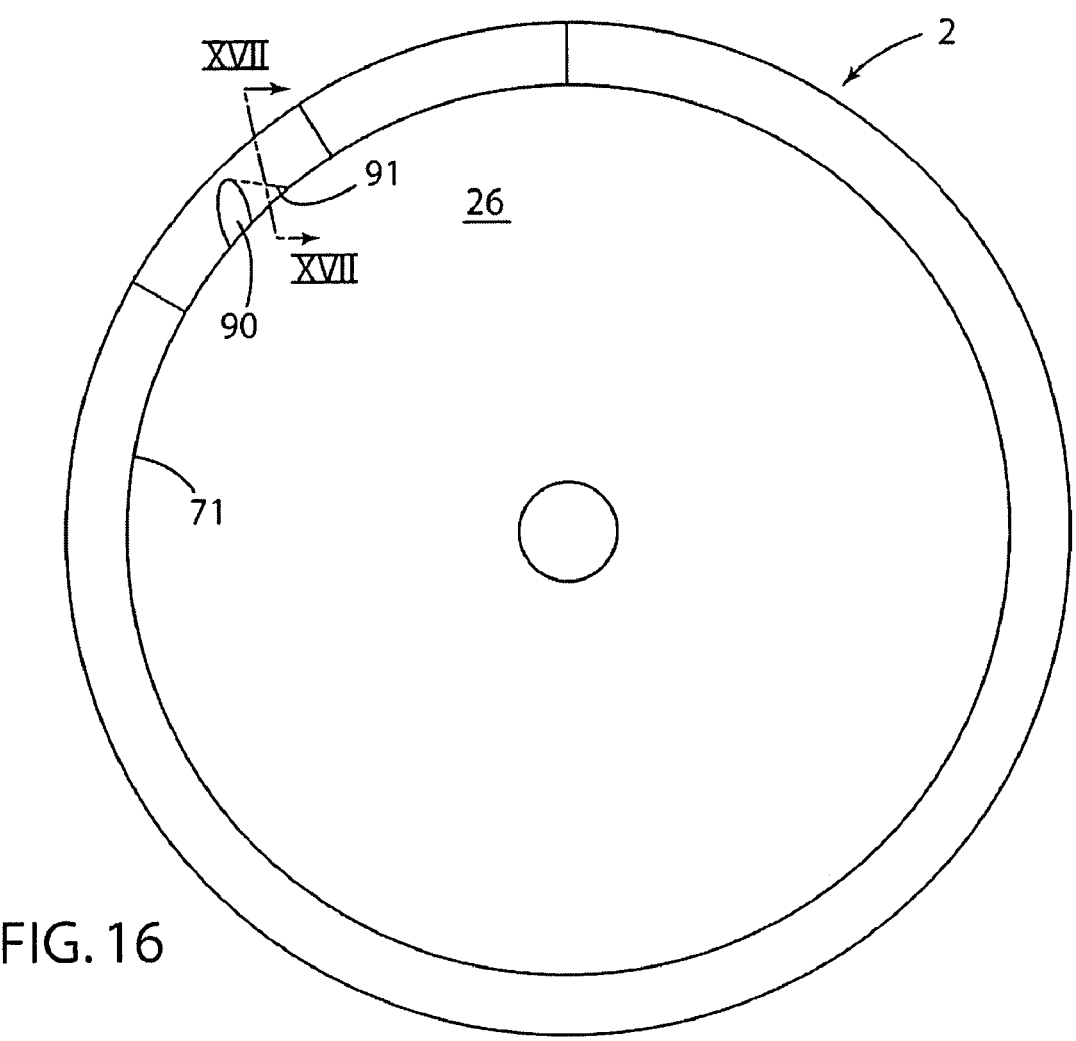
FIG. 16 is a view of a portion of the housing showing the reflector and reflector chamber.

A plurality of reflector plates or surfaces 90 are also formed in housing 2. The reflector surfaces 90 are formed in the housing 2 in an area adjacent stators 85 at second portion 88 of housing 2. In the illustrated example, reflector surfaces 90 are formed in a housing reflector module 95 that may be removed from housing 2. With further reference to FIG. 16, chamber 91 is formed by reflector surface 90 and chamber side wall 93. Chamber 91 fluidly connects the reflector surface 90 to the cavity 26 of housing 2, and defines a peripheral edge 92 at the intersection of side wall 93 and reflector surface 90. As illustrated in FIG. 17, chamber 91 may have an oval shape, and peripheral edge 92 of reflector surface 90 may also have an oval shape. The reflector surface 90 may be flat or concave. In a preferred configuration, the reflector surface 90 is somewhat concave to direct shockwaves exiting exhaust ports 64-67 back towards rotor vanes 50 of rotor 5. However, the exact configuration of reflector surface 90 and chamber 91 will depend upon the requirements of the specific engine design. FIG. 18 further illustrates the shape of reflector surface 90 and passageway 91.

The material forming reflector surface 90 and chamber 91 is a high temperature metal or other suitable material capable of retaining the required strength when heated due to exposure to the exhaust gas.

Figure 12:
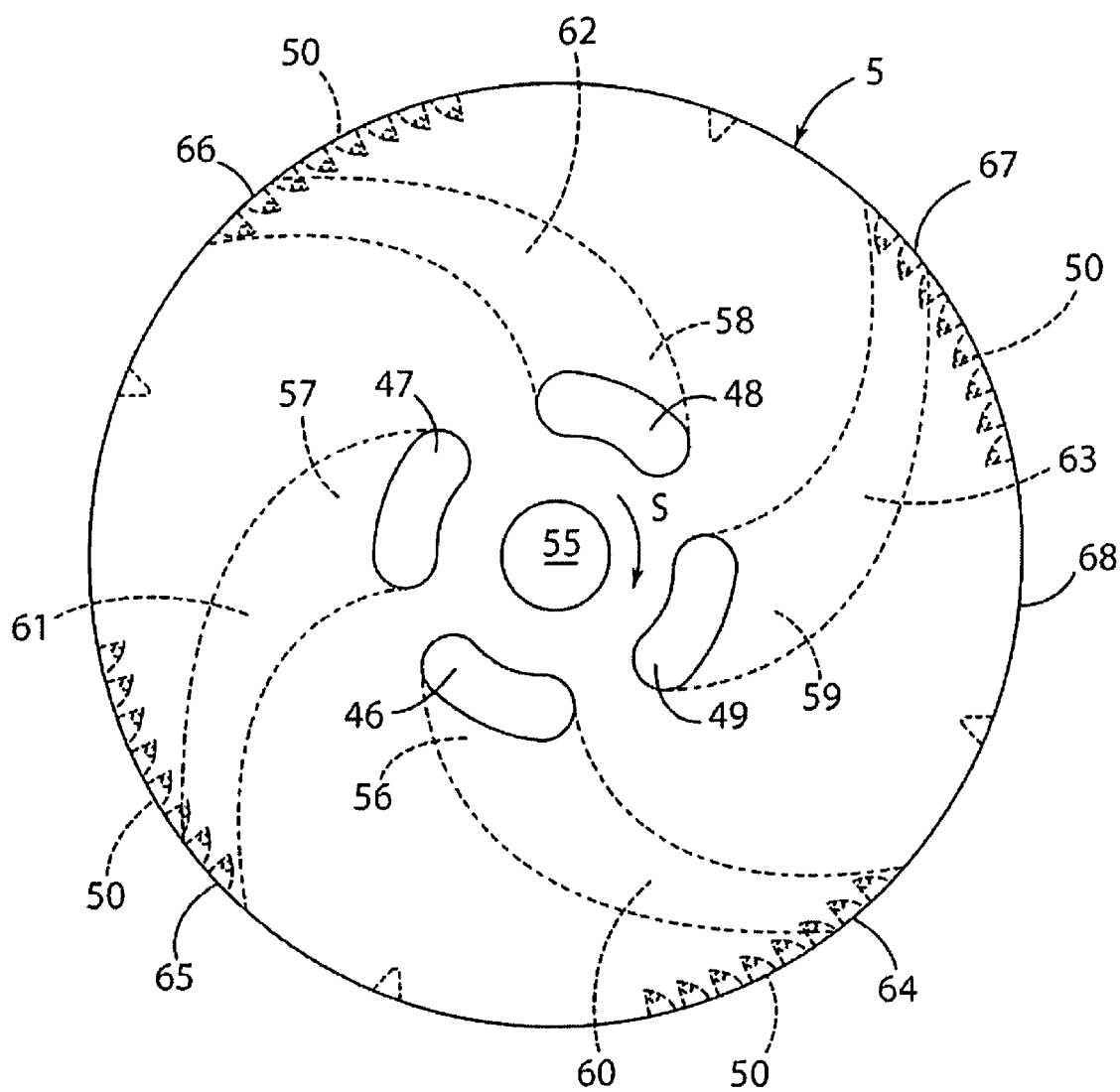
FIG. 12 is a view of the intake side of the rotor showing the combustion chambers and rotor vanes in dashed lines.
Figure 21:
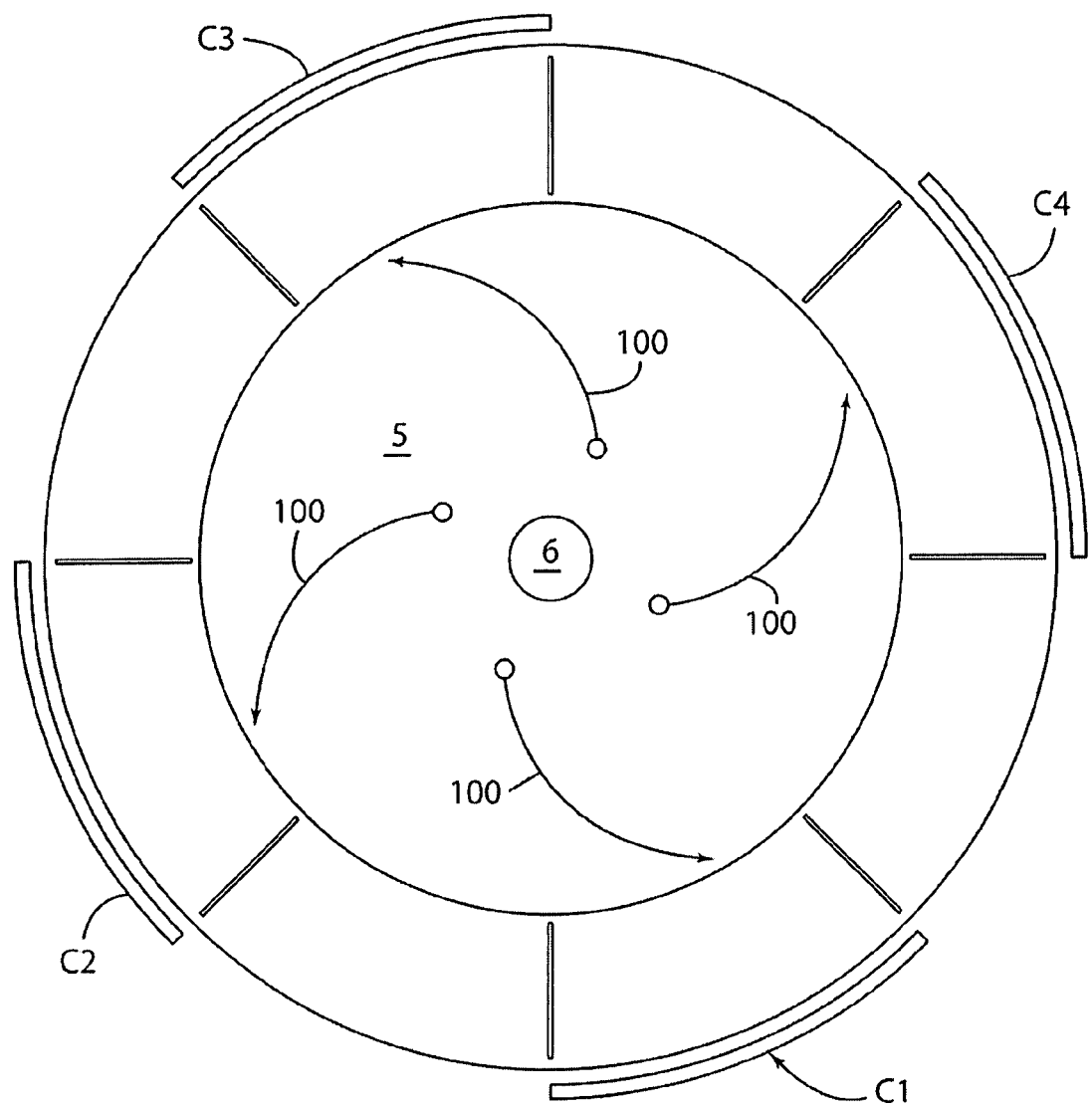
FIG. 21 is a partially schematic view of a rotor showing the combustion sequence and airflow.

With further reference to FIGS. 19-21, exhaust gas 100 is expelled from exhaust ports 64 in the direction of vector "T1" (FIG. 19). The exhaust gas is reflected from a reflective plane "R1" defined by reflective surface 90 in the direction of vector T2. A top view of the reflective surface 90, reflective plane R1, and exhaust vectors T1 and T2 is shown in FIG. 20. In the illustrated example, the exhaust vectors T1 and T2 form an angle θ1 therebetween, and the reflected exhaust gas vector T2 generally travels towards an area 96 of peripheral surface 68 of rotor 5 that is "in front of" exhaust port 64 when rotor 5 spins in the direction indicated by the arrow "S" of FIG. 19. However, it will be understood that the orientation of reflective surface 90 may be configured such that a reflective plane R2 is defined, and the exhaust gas is reflected in a direction shown by vector T3 at an angle θ2 relative to vector T1. The vector T3 generally points towards an area 97 of peripheral surface 68 of rotor 5 that is "downstream" of exhaust port 64 when rotor 5 spins in the direction of the arrow "S". It will be understood that the areas 96 and/or 97 of rotor 5 will include rotor vanes 50 as shown in FIGS. 12, 14 and 15. Reflective surfaces 90 may be configured such that vector T2 extends out of the plane of rotor 5 (i.e. into or out of the paper in FIG. 19). This provides for reflection of the shock waves in a direction having components that are parallel to the axis of rotation of rotor 5. With reference back to FIG. 11 rotor vanes 50 may be positioned on an outer portion of rotor 5 that is offset along the axis of rotor 5 relative to the exhaust parts 64. Positioning of reflective surfaces 90 at a compound angle ensures that the shock waves/exhaust gasses are directed towards the vanes 50 on rotor 5.

As the exhaust gas 100 travels along passageway 60 towards exhaust port 64, shockwaves 101 are formed. The shockwaves 101 travel in the directions shown by the vectors T1 and T2, and reflect from the reflective surface 90 back towards the rotor vanes 50 on rotor 5. As described in more detail below, the shockwaves 101 transfer energy to the rotor 5 via rotor vanes 50 to thereby capture additional energy created by the combustion of the air and fuel mixture.

Engine Operation

Figure 9:
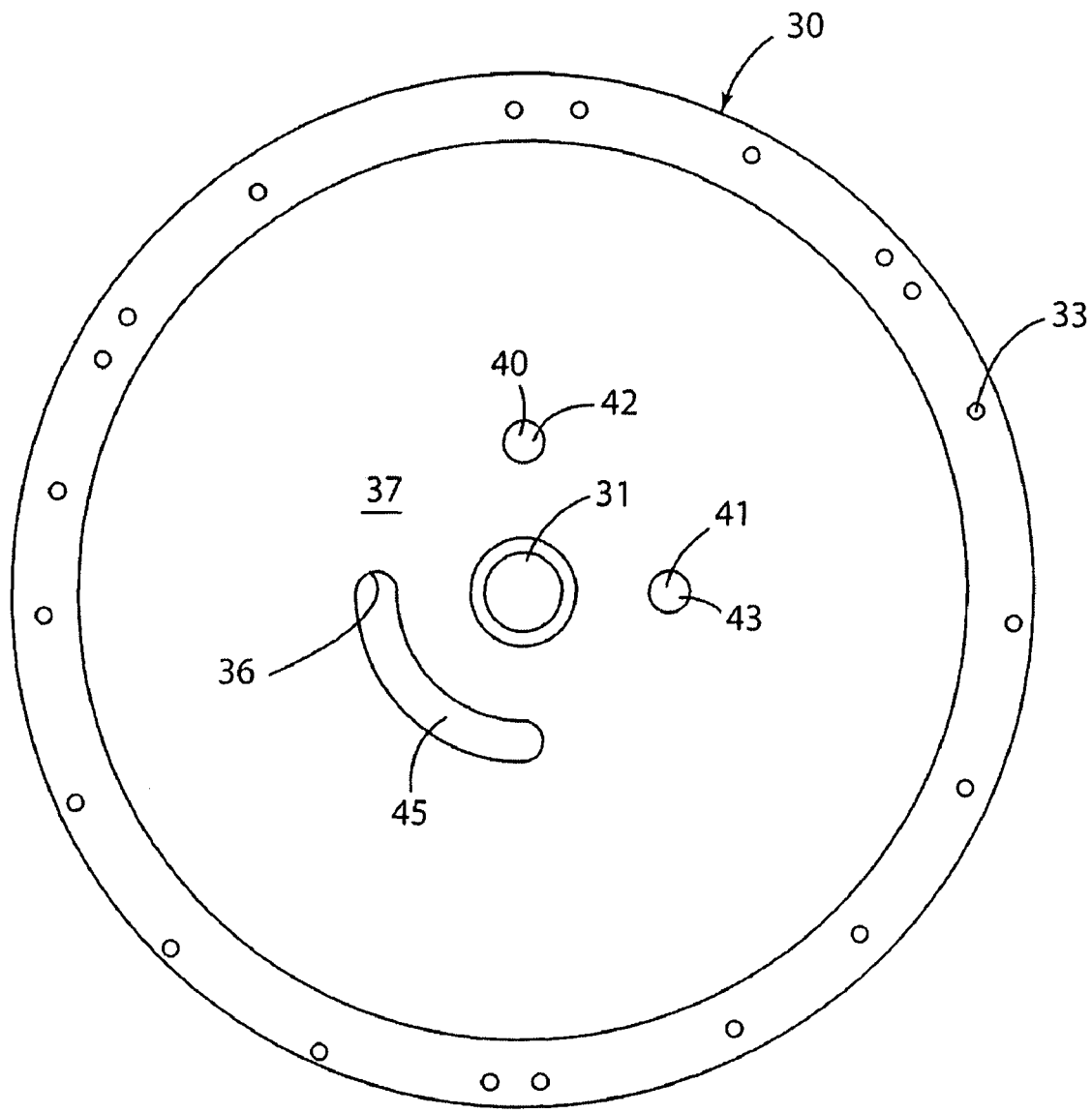
FIG. 9 is a view of the reversed side of the intake plate.
Figure 10:
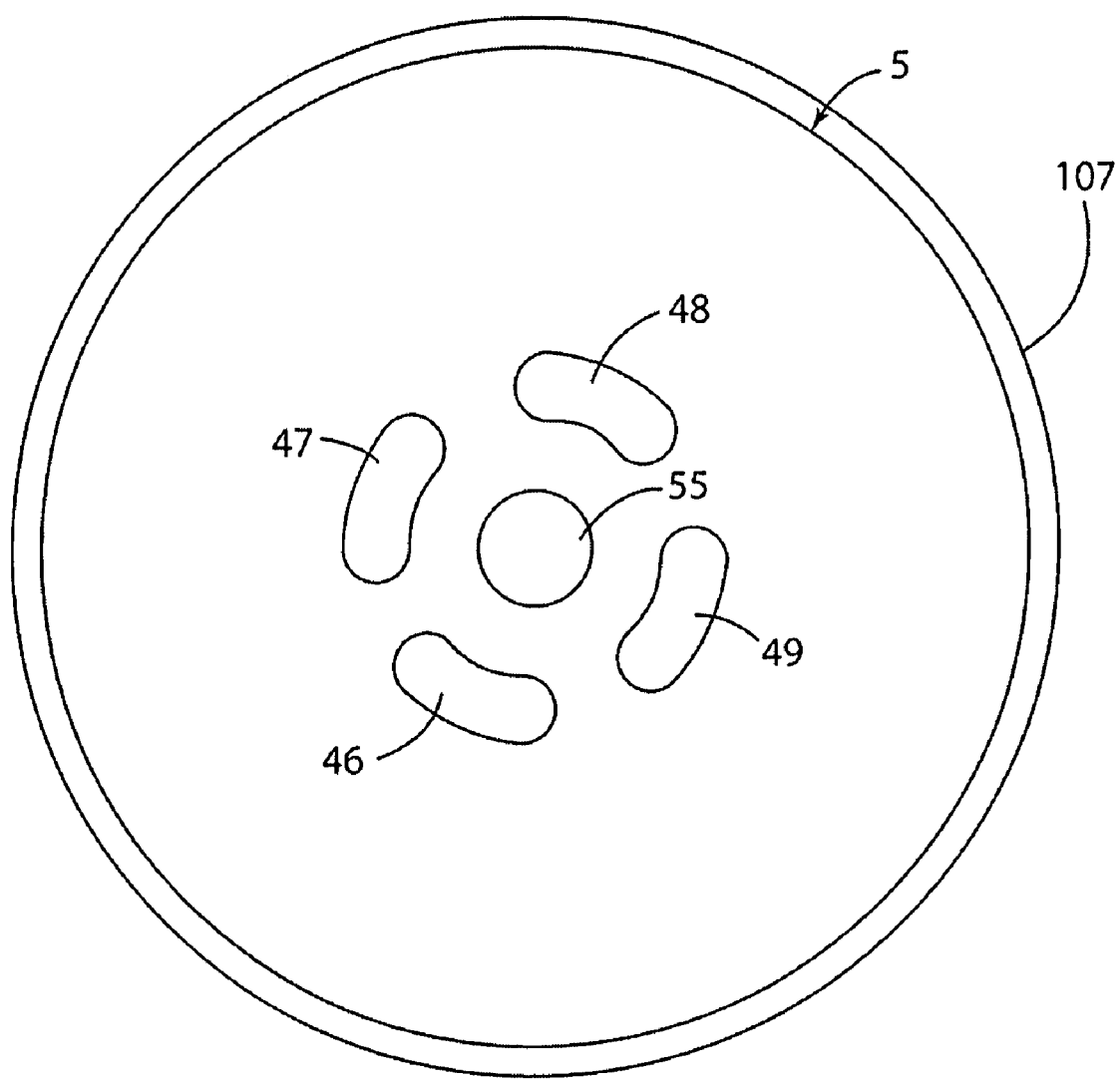
FIG. 10 is a view of the rotor from the intake side.
Figure 11:
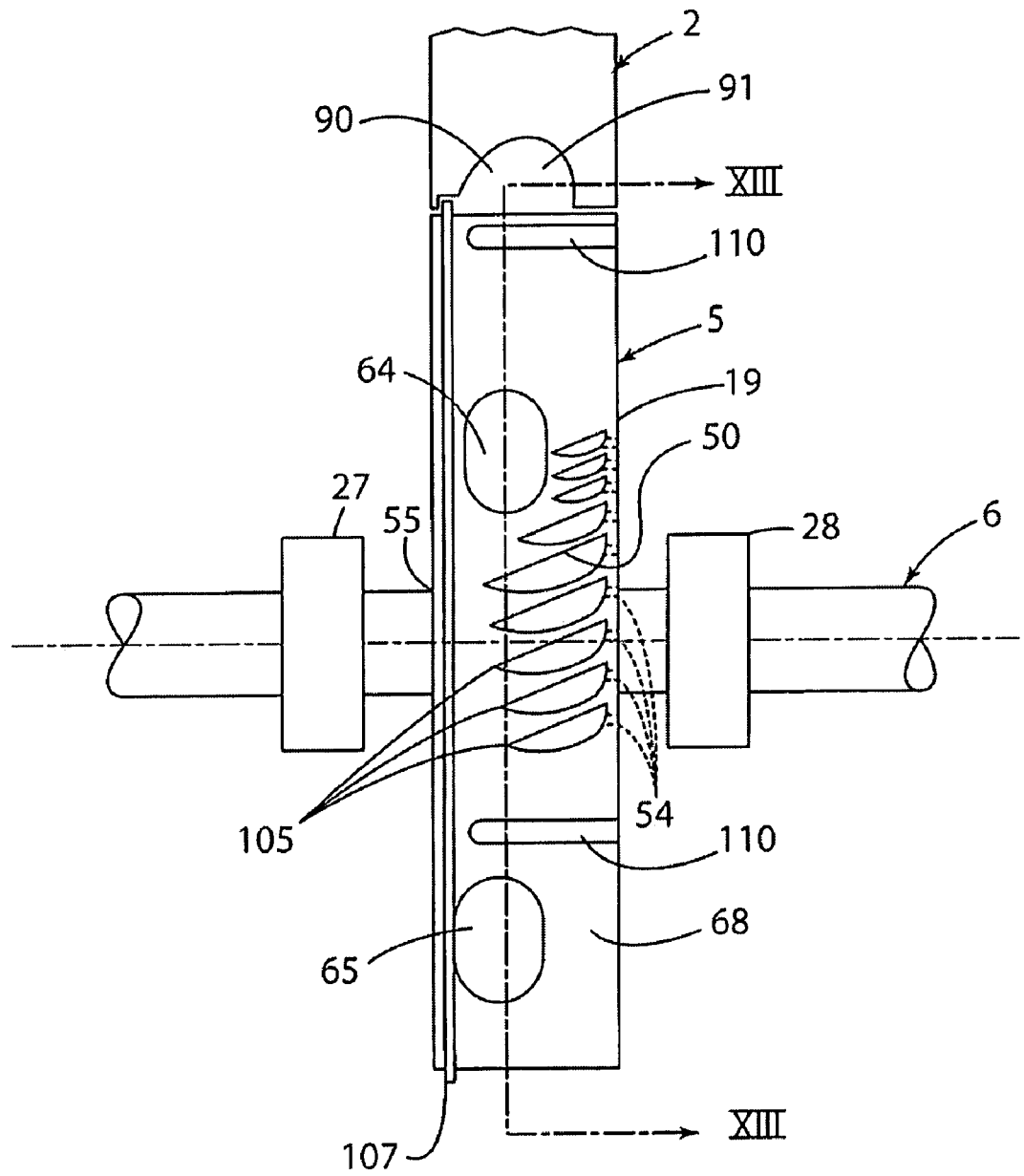
FIG. 11 is a partially fragmentary side elevational view of the rotor, shaft, and the reflector plate of the housing.

During operation, pressurized air is forced through opening 45 of sealing plate 30 (FIG. 4) and through one of the intake ports 46-49 that is aligned with opening 45. For purposes of the present discussion, intake port 46 will be used to describe the operation of engine 1. However, it will be understood that the other intake ports 47-49 and corresponding combustion chambers 57-59, passageways 61-63, and exhaust ports 65-67 function in substantially the same manner as does intake port 46 and the corresponding combustion chamber 56, passageway 60 and exhaust port 64. With further reference to FIGS. 9 and 12, as rotor 5 continues to rotate in the direction of the arrow "S" (FIG. 12), intake port 46 will move past end 36 (FIG. 9) of opening 45, such that intake port 46 is completely sealed off relative to the compressed air in fan housing 11 by area 37 of sealing plate 30. During this portion of the cycle, exhaust port 64 is traveling along a portion 82 (FIGS. 7 and 8) of cylindrical surface 71 of housing 2 that fits closely against outer surface 68 of rotor 5, such that the pressurized air entering intake port 46 cannot escape through exhaust port 64.

As the rotor 5 continues to rotor in the direction of the arrow "S" (FIG. 12), intake port 46 becomes aligned with fuel injector 40 (FIG. 9), and fuel is injected into the combustion chamber 56 through intake port 46. As the rotor 5 continues to rotate, the intake port 46 next becomes aligned with spark plug 41 (FIG. 9). Controller 18 causes spark plug 41 to fire, thereby igniting the compressed air and fuel in combustion chamber 56. When the air and fuel is ignited, rotor 5 is oriented such that exhaust port 64 is aligned with, or is about to become aligned with reflector surfaces 90 (FIGS. 7 and 8). The exhaust gas 100 (FIG. 19) forms shockwaves 101 that are reflected from reflector surfaces 90 back towards rotor 5. The shockwaves 101 contact the rotor vanes 50 (FIGS. 11, 12 and 14) of rotor 5, and thereby generate a force on rotor 5 tending to rotate the rotor 5. It will be understood that this force is in addition to the force generated by the expulsion of exhaust gas 100 in the direction of the vector T1 (FIG. 19). After being reflected into rotor vanes 50, the exhaust gas escapes through exhaust vent holes 54 of rotor vanes 50 and into the curved portion 76 (FIG. 8) of exhaust port 75. The exhaust gas then escapes through openings 78 into exhaust pipes 79.

As rotor 5 continues to rotate, the exhaust port 64 rotates into position adjacent the stators 85 (FIGS. 7 and 8) of housing 2. Additional exhaust gas 100 is expelled from exhaust port 64 as the rotor 5 continues to rotate. The exhaust gas interacts with the stators 85 and rotor vanes 50 to generate additional forces acting on the rotor 5. Combustion of the air/fuel mixture generates two primary types of energy; energy from the shockwaves and kinetic energy in the exhaust gas itself due to the mass and velocity of the gas. The reflector receives and reflects the shockwave energy back to the rotor. At high rotation speeds the high pressure gases need time to expel from the chamber. The only path for the exhaust gas is through the curved stators that direct the exhaust gas back to the rotor.

As the rotor 5 continues to rotate, the exhaust port 64 moves past the stators 85 and into the area 98 of cylindrical surface 71 of housing 2 adjacent opening 78. It will be understood that housing 2 may have another opening (not shown) in addition to the opening 78 formed in inner surface 71 of housing 2 in the area 99 of housing 2 that permits escape of residual exhaust gas from exhaust port 64 as intake port 46 initially becomes aligned with opening 45 in seal plate 30. In this way, residual exhaust gas is cleared from combustion chamber 56 and passageway 60 due to compressed air entering intake port 46.

With further reference to FIG. 22, the above-described combustion sequence can be shown to include an air intake portion C1, a fuel injection portion C2, and ignition/thrust portion C3, and a portion C4 wherein remaining exhaust gas is expelled. It will be understood that each of the four combustion sequence components are shown in FIG. 22 as having an equal angular size. However, the actual angular "sizes" of the combustion sequence components may be different, and need not be 45° as illustrated in FIG. 22.

The rotary pulse engine 1 described above does not require reciprocating components, and can utilize virtually any combustible vapor for operation. Because there are no reciprocating components, the engine 1 is substantially free of vibration, and does not require counter-weights or the like.

Although a specific version of the engine 1 has been described in detail above for purposes of explanation, an engine 1 according to the present invention may configured in numerous different ways. For example, although each combustion chamber may fire more than once per revolution. If more than one combustion sequence per revolution per combustion chamber is desired, the appropriate intake openings in seal plate 30 are provided, as are the appropriately placed fuel injector and spark plugs. Also, the housing of such an engine will include multiple sets of reflector surfaces, stators and exhaust ports to accommodate the desired number of combustion sequences per revolution.

Accordingly to other aspects of the present invention, the engine may also include more than one rotor 5 in a single engine. For example, a first rotor may have combustion chambers and exhaust ports having a first configuration to provide maximum power at a first rpm, and a second rotor may have combustion chambers and exhaust ports having a different shape and configuration having peak power at a different rpm. Still further, a single rotor may include combustion chambers and exhaust ports having a first configuration, as well as additional combustion chambers and exhaust ports having one or more different configurations. In this way, the rpm at which peak power occurs can be adapted for a particular purpose, and the power band of the engine can also be tailored to a particular application.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An internal combustion engine, comprising:
a stationary structure defining a cavity;
a rotating member rotatably disposed in the cavity for rotation about an axis of rotation, the rotating member having a peripheral portion including a plurality of vanes; the rotating member also including at least one combustion chamber fluidly connected to at least one intake port formed in the rotating member, the rotating member further including at least one exhaust port fluidly connected to the combustion chamber and extending outwardly from the combustion chamber to the peripheral portion of the rotating member;
a fuel supply system operably connected to the intake port and supplying combustible material to the combustion chamber;
an ignition system adapted to ignite combustible material in the combustion chamber; and wherein:
the stationary structure includes at least one reflective surface facing the peripheral portion of the rotating member in a direction toward said vanes as they pass by and beyond said reflective surface, wherein shock waves formed by exhaust gas being expelled from at least one exhaust port reflect off said reflective surface are directed against said vanes in said peripheral portion of said rotating member to impart rotary motion to said rotating member; wherein the stationary structure includes a plurality of stators in the form of fins or blades formed in a portion of said cavity located adjacent the periphery of said rotating member and disposed in an arc.

2. The internal combustion engine of claim 1, including:
a compressor supplying pressurized air to the intake ports.

3. The internal combustion engine of claim 2, wherein:
the rotating member cycles once every three hundred and sixty degrees rotation of the rotating member;
the stationary structure includes an inlet fluidly connected to the compressor, and wherein the inlet aligns with the intake ports only during intake portion of the cycle that is substantially less than three hundred and sixty degrees.

4. The internal combustion engine of claim 3, wherein:
the stationary structure closes off the intake ports during portions of the cycle other than the intake portion.

5. The internal combustion engine of claim 1 in which said stationary member includes an exhaust port in communication with said cavity; said stators being arranged in an arc extending generally from said reflective surface to said exhaust port.

6. The internal combustion engine of claim 5 in which said vanes in said rotating member extend in an arc generally from a point adjacent said combustion chamber exhaust port.

7. The internal combustion engine of claim 1 in which said reflective surface defines a reflective direction normal to the reflective surface, and wherein the reflective direction forms an acute angle relative to a radius extending from the axis of rotation of the rotating member to the reflective surface.

8. The internal combustion engine of claim 1 internal wherein: the rotating member vanes include opposite side surfaces defining pockets between adjacent pairs of rotating member vanes.

9. The internal combustion engine of claim 8, wherein: the rotating member is disk shaped with generally circular front and rear side faces, and a generally cylindrical peripheral edge portion; and wherein: the rotor pockets are disposed on the peripheral edge portion of the rotating member; and including: secondary exhaust ports extending from the rotor pockets to the rear side face of the rotating member.

10. The internal combustion engine of claim 9, wherein: the rotor pockets are disposed adjacent said exhaust port.

11. The internal combustion engine of claim 6, wherein: the rotating member includes at least four combustion chambers and at least one inlet opening and at least one primary exhaust port fluidly connected to each said combustion chamber.

12. The internal combustion engine of claim 11 in which said vanes in said rotating member extend in arcs generally from a point adjacent each said combustion chamber exhaust port, towards the next adjacent combustion chamber exhaust port.

13. The internal combustion engine of claim 12, wherein: the at least four combustion chambers are substantially identical to one another, and spaced at ninety degree intervals about the axis of rotation.

14. The internal combustion engine of claim 11, wherein: the four primary combustion chambers form curved spirals; and the four inlet openings are formed in the front side face of the rotating member.

15. The internal combustion engine of claim 1 which includes: a plurality of said combustion chambers, and at least one inlet opening and at least one primary exhaust port for each said combustion chamber, fluidly connected to their respective combustion chambers.

16. The internal combustion engine of claim 15, wherein: the reflective surface defines a reflective direction normal to the reflective surface, and wherein: the reflective directions form an acute angle relative to a radius extending from the axis of rotation to the exhaust port of the rotating member.

17. The internal combustion engine of claim 15, wherein: the reflective surfaces are flat.

18. The internal combustion engine of claim 15, wherein: the reflective surfaces are concave.

19. The internal combustion engine of claim 15, wherein: the reflective direction forms an acute angle relative to the axis of rotation.

\* \* \* \* \*

UNITED STATES PATENT AND TRADEMARK OFFICE
CERTIFICATE OF CORRECTION

| | | |
|---|---|---|
| PATENT NO. | : 7,963,096 B2 | |
| APPLICATION NO. | : 11/874271 | |
| DATED | : June 21, 2011 | |
| INVENTOR(S) | : Alex VanHolstyn | |

It is certified that error appears in the above-identified patent and that said Letters Patent is hereby corrected as shown below:

Col. 1, Line 17:
 "foul" should be --four--

Col. 3, Line 55:
 "(lie" should be --the--

Col. 6, Line 25:
 "rotor" (2d occurrence) should be --rotate--

Col. 7, Line 20:
 after "may" insert --be--

Signed and Sealed this
Twentieth Day of December, 2011

David J. Kappos
*Director of the United States Patent and Trademark Office*